United States Patent
Ju

(10) Patent No.: US 11,489,156 B2
(45) Date of Patent: *Nov. 1, 2022

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventor: Seo Hee Ju, Daejeon (KR)

(73) Assignee: LG Chem, Ltd.

( * ) Notice: Subject to any disclaimer, the term of this patent is extended or adjusted under 35 U.S.C. 154(b) by 324 days.

This patent is subject to a terminal disclaimer.

(21) Appl. No.: 16/754,027

(22) PCT Filed: Oct. 19, 2018

(86) PCT No.: PCT/KR2018/012452
§ 371 (c)(1),
(2) Date: Apr. 6, 2020

(87) PCT Pub. No.: WO2019/078688
PCT Pub. Date: Apr. 25, 2019

(65) Prior Publication Data
US 2020/0328417 A1  Oct. 15, 2020

(30) Foreign Application Priority Data
Oct. 20, 2017  (KR) .................. 10-2017-0136891

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/366* (2013.01);
(Continued)

(58) Field of Classification Search
CPC ...... H01M 4/366; H01M 4/485; H01M 4/525; H01M 4/5825; H01M 2004/028;
(Continued)

(56) References Cited

U.S. PATENT DOCUMENTS

2007/0082265 A1   4/2007  Itou et al.
2008/0254368 A1*  10/2008  Ooyama ........... H01M 10/0587
                                          429/223
(Continued)

FOREIGN PATENT DOCUMENTS

CN   101276911 A   10/2008
CN   102496710 A    6/2012
(Continued)

OTHER PUBLICATIONS

Chinese Search Report for Application No. 201880066202.2 dated Nov. 19, 2021, 3 pages.
(Continued)

*Primary Examiner* — Brittany L Raymond
(74) *Attorney, Agent, or Firm* — Lerner, David, Littenberg, Krumholz & Mentlik, LLP

(57) ABSTRACT

A positive electrode active material includes a lithium transition metal oxide represented by Formula 1, and a lithium-containing inorganic compound layer formed on a surface of the lithium transition metal oxide, $$Li_{1+a}(Ni_bCo_cX_dM^1_eM^2_f)_{1-a}O_2 \qquad \text{[Formula 1]}$$

in Formula 1, X is at least one selected from the group consisting of manganese (Mn) and aluminum (Al), $M^1$ is at least one selected from the group consisting of sulfur (S), fluorine (F), phosphorus (P), and nitrogen (Continued)

(N), $M^2$ is at least one selected from the group consisting of zirconium (Zr), boron (B), cobalt (Co), tungsten (W), magnesium (Mg), cerium (Ce), tantalum (Ta), titanium (Ti), strontium (Sr), barium (Ba), hafnium (Hf), F, P, S, lanthanum (La), and yttrium (Y), $0 \leq a \leq 0.1$, $0.6 \leq b \leq 0.99$, $0 \leq c \leq 0.2$, $0 \leq d \leq 0.2$, $0 < e \leq 0.1$, and $0 < f \leq 0.1$. A method of preparing the positive electrode active material, a positive electrode and a lithium secondary battery are also provided.

12 Claims, 1 Drawing Sheet

(51) Int. Cl.
*H01M 4/36* (2006.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2004/80* (2013.01); *C01P 2006/40* (2013.01); *C01P 2006/80* (2013.01); *H01M 2004/028* (2013.01)

(58) Field of Classification Search
CPC ...... C01G 53/42; C01G 53/50; C01G 53/006; C01G 25/006; C01B 35/12
See application file for complete search history.

(56) References Cited

U.S. PATENT DOCUMENTS

| | | | |
|---|---|---|---|
| 2016/0013476 A1* | 1/2016 | Oh | H01M 4/1391 427/126.3 |
| 2016/0197346 A1 | 7/2016 | Myung et al. | |
| 2017/0200951 A1* | 7/2017 | Hong | H01M 4/366 |
| 2017/0317342 A1 | 11/2017 | Kang et al. | |

FOREIGN PATENT DOCUMENTS

| | | |
|---|---|---|
| CN | 104781960 A | 7/2015 |
| CN | 106395920 A | 2/2017 |
| CN | 107017405 A | 8/2017 |
| JP | 2008251434 A | 10/2008 |
| JP | 2012089406 A | 5/2012 |
| KR | 20060121272 A | 11/2006 |
| KR | 20130108717 A | 10/2013 |
| KR | 20150018752 A | 2/2015 |
| KR | 20150049288 A | 5/2015 |
| KR | 20150050153 A | 5/2015 |
| KR | 20160040118 A | 4/2016 |
| KR | 101651338 B1 | 8/2016 |
| KR | 20160118081 A | 10/2016 |
| KR | 20170063383 A | 6/2017 |

OTHER PUBLICATIONS

International Search Report from Application No. PCT/KR2018/012452 dated Apr. 11, 2019, 2 pages.

* cited by examiner

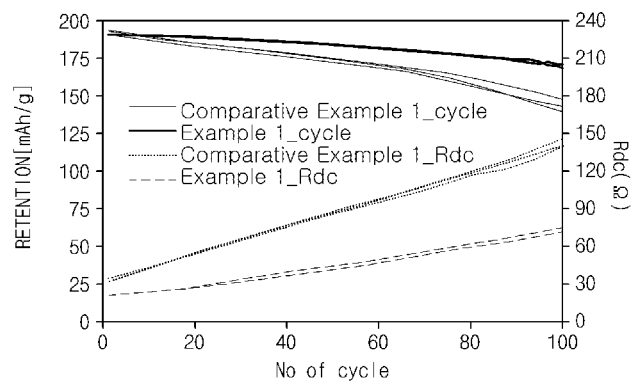

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2018/012452, filed Oct. 19, 2018, which claims priority to Korean Patent Application No. 10-2017-0136891, filed Oct. 20, 2017, the disclosures of which are incorporated herein by reference.

TECHNICAL FIELD

The present invention relates to a positive electrode active material for a lithium secondary battery, a method of preparing the positive electrode active material, and a positive electrode for a lithium secondary battery and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt metal oxide, in which a portion of nickel (Ni) is substituted with cobalt (Co), manganese (Mn), or aluminum (Al), has been developed.

However, with respect to the lithium nickel cobalt metal oxide, there is a limitation in that safety and life characteristics of the battery are rapidly degraded by an increase in interfacial resistance between an electrolyte and an electrode including an active material as charge and discharge are repeated, electrolyte decomposition due to moisture in the battery or other influences, degradation of a surface structure of the active material, and an exothermic reaction accompanied by rapid structural collapse, and such limitation is particularly more severe under high-temperature and high-voltage conditions.

In order to address such limitation, methods of not only improving structural stability of the active material itself by doping the lithium nickel cobalt metal oxide and improving surface stability by coating a surface of the lithium nickel cobalt metal oxide, but also increasing stability of an interface between the electrolyte and the active material have been proposed. Typically, a method of forming a coating layer on a surface by using a dry coating method during the synthesis of a positive electrode active material has been conducted. However, in this case, since it is not easy to uniformly form the coating layer on the surface, it is not fully satisfactory in terms of its effect and process.

Thus, there is a need to develop a positive electrode active material which includes a lithium nickel cobalt metal oxide, wherein resistance may be reduced by forming a uniform coating layer on the surface of the lithium nickel cobalt metal oxide and a battery having improved stability and life characteristics may be prepared.

DISCLOSURE OF THE INVENTION

Technical Problem

An aspect of the present invention provides a positive electrode active material in which a surface of a $M^1$ and $M^2$-doped lithium transition metal oxide is coated with a lithium-containing inorganic compound to improve life characteristics and reduce resistance.

Another aspect of the present invention provides a method of preparing a positive electrode active material in which a lithium-containing inorganic compound layer may be uniformly formed on the surface of the $M^1$ and $M^2$-doped lithium transition metal oxide by using a wet process.

Another aspect of the present invention provides a positive electrode for a lithium secondary battery which includes the positive electrode active material.

Another aspect of the present invention provides a lithium secondary battery including the positive electrode for a lithium secondary battery.

Technical Solution

According to an aspect of the present invention, there is provided a positive electrode active material including: a lithium transition metal oxide represented by the following Formula 1; and a lithium-containing inorganic compound layer formed on a surface of the lithium transition metal oxide:

$$Li_{1+a}(Ni_bCo_cX_dM^1_eM^2_f)_{1-a}O_2 \qquad \text{[Formula 1]}$$

in Formula 1, X is at least one selected from the group consisting of manganese (Mn) and aluminum (Al), $M^1$ is at least one selected from the group consisting of sulfur (S), fluorine (F), phosphorus (P), and nitrogen (N), $M^2$ is at least one selected from the group consisting of zirconium (Zr), boron (B), cobalt (Co), tungsten (W), magnesium (Mg), cerium (Ce), tantalum (Ta), titanium (Ti), strontium (Sr), barium (Ba), hafnium (Hf), F, P, S, lanthanum (La), and yttrium (Y), $0 \leq a \leq 0.1$, $0.6 \leq b \leq 0.99$, $0 \leq c \leq 0.2$, $0 \leq d \leq 0.2$, $0 < e \leq 0.1$, and $0 < f \leq 0.1$.

According to another aspect of the present invention, there is provided a method of preparing a positive electrode active material which includes: mixing and sintering a doping element $M^1$-doped transition metal hydroxide precursor, a lithium raw material, and a doping element $M^2$-containing raw material to prepare a lithium transition metal oxide represented by Formula 1; mixing the lithium transition metal oxide with an aqueous inorganic acid solution to prepare a mixed solution; and drying and heat-treating the mixed solution to form a lithium-containing inorganic compound layer on a surface of the lithium transition metal oxide.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

According to the present invention, structural stability of a lithium transition metal oxide may be improved by using the lithium transition metal oxide doped with specific doping elements, preferably, sulfur (S) and zirconium (Zr), and, accordingly, life characteristics may be improved. In addition, since mobility of lithium ions is improved by coating a surface of the lithium transition metal oxide with a lithium-containing inorganic compound layer, charge and discharge efficiency may be improved and a positive electrode active material having reduced resistance may be prepared. Also, since structural stability and surface stability of the positive electrode active material are improved, a battery having improved life characteristics may be prepared.

Furthermore, since the positive electrode active material is prepared by using a wet process in which the lithium transition metal oxide is mixed with inorganic acid, the lithium-containing inorganic compound layer may be uniformly coated on the surface of the lithium transition metal oxide.

In addition, since the inorganic acid reacts with lithium impurities present in the surface of the lithium transition metal oxide to form the lithium-containing inorganic compound layer, an amount of lithium impurities in a surface of the finally-prepared positive electrode active material may be reduced. Accordingly, electrochemical performance of the secondary battery may be further improved by preventing expansion of the battery due to a side reaction between the positive electrode active material and an electrolyte solution in advance.

BRIEF DESCRIPTION OF THE DRAWINGS

FIG. 1 is a graph illustrating capacity and resistance increase rates of lithium secondary batteries prepared in Example 1 and Comparative Example 1 according to cycles.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A conventionally used lithium transition metal oxide has a limitation in that stability and life characteristics of a battery are rapidly degraded, for example, interfacial resistance between an electrode and an electrolyte is increased and the electrolyte is decomposed as charge and discharge are repeated. In order to address this limitation, a surface of the lithium transition metal oxide has typically been coated with a lithium-containing inorganic compound layer by using a dry process. However, in a case in which the dry coating method is used, since the lithium-containing inorganic compound layer is not uniformly coated, there is a limitation in that an effect of improving stability of the positive electrode active material is insignificant.

Thus, the present inventors not only allow structural stability of the positive electrode active material to be improved by coating a lithium transition metal oxide with at least two doping elements, but also allow surface stability of the positive electrode active material to be improved by forming a lithium-containing inorganic compound layer on a surface of the lithium transition metal oxide. Also, the present inventors found that, since the amount of lithium impurities present in the surface may be reduced while uniformly coating the lithium-containing inorganic compound layer by using a wet process of mixing the lithium transition metal oxide with an aqueous inorganic acid solution during the preparation of the lithium-containing inorganic compound layer, a battery having improved stability and life characteristics may be prepared, thereby leading to the completion of the present invention.

A positive electrode active material according to the present invention includes a lithium transition metal oxide represented by the following Formula 1 and a lithium-containing inorganic compound layer formed on a surface of the lithium transition metal oxide:

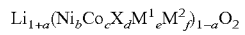

[Formula 1]
$$Li_{1+a}(Ni_bCo_cX_dM^1_eM^2_f)_{1-a}O_2$$

in Formula 1, X is at least one selected from the group consisting of manganese (Mn) and aluminum (Al), $M^1$ is at least one selected from the group consisting of sulfur (S), fluorine (F), phosphorus (P), and nitrogen (N), $M^2$ is at least one selected from the group consisting of zirconium (Zr), boron (B), cobalt (Co), tungsten (W), magnesium (Mg), cerium (Ce), tantalum (Ta), titanium (Ti), strontium (Sr), barium (Ba), hafnium (Hf), F, P, S, lanthanum (La), and yttrium (Y), $0 \leq a \leq 0.1$, $0.6 \leq b \leq 0.99$, $0 \leq c \leq 0.2$, $0 \leq d \leq 0.2$, $0 < e \leq 0.1$, and $0 < f \leq 0.1$.

Specifically, the positive electrode active material may include a lithium transition metal oxide containing nickel in an amount of 60 mol % or more, for example, 60 mol % to 99 mol % based on a total number of moles of transition metals excluding lithium. In a case in which the large amount of nickel is included as described above, capacity characteristics of a battery may be improved when the positive electrode active material is used in the battery.

Also, the lithium transition metal oxide may include a doping elements $M^1$ and $M^2$-doped lithium transition metal oxide. For example, since the lithium transition metal oxide is doped with at least two metallic elements, $M^1$ and $M^2$, surface stability and structural stability according to a difference in positions of the doping elements caused by a difference in diffusion rates of the two different doping materials may be secured, and life characteristics of a battery, in which the lithium transition metal oxide is used, may be improved. For example, in a case in which the lithium transition metal oxide includes only one of $M^1$ and $M^2$ as a doping element, the life characteristics may be relatively degraded in comparison to a case where two types of doping elements are included.

Specifically, the positive electrode active material may include the doping element $M^1$ in an amount of 0.0001 part by weight to 5 parts by weight, for example, 0.001 part by weight to 0.01 part by weight based on 100 parts by weight of the positive electrode active material. For example, the doping element $M^1$ may be at least one selected from the group consisting of S, F, P, and N, and may be most preferably S. In a case in which the lithium transition metal oxide includes the doping element $M^1$, the life characteristics may be improved by securing the surface stability.

The positive electrode active material may include the doping element $M^2$ in an amount of 0.0001 part by weight to 5 parts by weight, for example, 0.001 part by weight to 0.01 part by weight based on 100 parts by weight of the positive electrode active material. For example, the doping element $M^2$ may be at least one selected from the group consisting of Zr, B, Co, W, Mg, Ce, Ta, Ti, Sr, Ba, Hf, F, P, S, La, and Y, and may preferably include Zr. Since the lithium transition metal oxide includes the doping element $M^2$, the structural stability of the lithium transition metal oxide may be improved and the life characteristics may be improved.

The lithium transition metal oxide may more preferably be at least one selected from the group consisting of
$Li_xNi_{0.8}Co_{0.1}Mn_{0.1}Zr_{0.04}S_{0.03}O_2$ (1.0≤x≤1.10),
$Li_xNi_{0.6}Co_{0.2}Mn_{0.2}Zr_{0.05}S_{0.03}O_2$ (1.0≤x≤1.0),
$Li_xNi_{0.87}Co_{0.07}Mn_{0.06}Zr_{0.03}S_{0.03}O_2$ (1.0≤x≤1.10),
$Li_xNi_{0.9}Co_{0.05}Mn_{0.05}Zr_{0.03}S_{0.03}O_2$ (1.0≤x≤1.0),
$Li_xNi_{0.95}Co_{0.03}Mn_{0.02}Zr_{0.02}S_{0.03}O_2$ (1.0≤x≤1.10),
$Li_xNi_{0.8}Co_{0.1}Mn_{0.1}Al_{0.05}S_{0.03}O_2$ (1.0≤x≤1.10),
$Li_xNi_{0.6}Co_{0.2}Mn_{0.2}Al_{0.05}S_{0.03}O_2$ (1.0≤x≤1.10),
$Li_xNi_{0.87}Co_{0.07}Mn_{0.06}Al_{0.03}S_{0.03}O_2$ (1.0≤x≤1.10),
$Li_xNi_{0.9}Co_{0.05}Mn_{0.05}Al_{0.03}S_{0.03}O_2$ (1.0≤x≤1.10), and
$Li_xNi_{0.95}Co_{0.03}Mn_{0.02}Al_{0.02}S_{0.03}O_2$ (1.0≤x≤1.10).

Also, the positive electrode active material may include a lithium-containing inorganic compound layer formed on the surface of the lithium transition metal oxide.

Specifically, the lithium-containing inorganic compound layer may include at least one selected from the group consisting of $Li_3BO_3$, $LiBO_2$, $Li_3PO_4$, and $LiPO_3$. Since the lithium-containing inorganic compound layer is formed on the surface of the lithium transition metal oxide as described above, mobility of lithium ions may be improved, and, accordingly, electrical conductivity of the positive electrode active material may be improved to improve charge and discharge efficiency of a battery in which the positive electrode active material is used.

The lithium-containing inorganic compound layer may be uniformly formed across the entire surface of the lithium transition metal oxide.

The lithium-containing inorganic compound layer may be formed to a thickness of 1 nm to 200 nm, for example, 3 nm to 100 nm, and, in a case in which the thickness satisfies the above range, since the occurrence of a side reaction is suppressed by blocking a contact between the positive electrode active material and an electrolyte solution included in the lithium secondary battery, expansion of the battery may be suppressed when used in the battery. Thus, the life characteristics may be improved.

The positive electrode active material includes lithium impurities in the surface thereof in an amount of 0.1 wt % to 1.0 wt %, for example, 0.4 wt % to 0.8 wt % based on a total weight of the positive electrode active material. The lithium impurities may be at least one selected from the group consisting of LiOH and $Li_2CO_3$. In a case in which the lithium impurities are included in an amount within the above range, the side reaction with the electrolyte solution during charge and discharge of the secondary battery may be reduced. Accordingly, since the expansion of the battery, which may occur due to the side reaction of the electrolyte solution with the lithium impurities present in the surface of the positive electrode active material, may be suppressed, the structural stability and life characteristics of the battery, in which the positive electrode active material is used, may be improved.

The amount of the lithium impurities in the surface of the positive electrode active material may be measured by titration with 0.1 M HCl using an acid-base titrator. Type and concentration of the acid used for the titration and reference pH may be appropriately changed and used, if necessary.

Also, the present invention provides a method of preparing a positive electrode active material which includes: mixing and sintering a doping element $M^1$-doped transition metal hydroxide precursor, a lithium raw material, and a doping element $M^2$-containing raw material to prepare a $M^1$ and $M^2$-doped lithium transition metal oxide; mixing the lithium transition metal oxide with an aqueous inorganic acid solution to prepare a mixed solution; and drying and heat-treating the mixed solution to form a lithium-containing inorganic compound layer on a surface of the lithium transition metal oxide.

First, a $M^1$ and $M^2$-doped lithium transition metal oxide is prepared by mixing and sintering a doping element $M^1$-doped transition metal hydroxide precursor, a lithium raw material, and a doping element $M^2$-containing raw material.

The transition metal hydroxide precursor may contain nickel in an amount of 60 mol % or more based on a total number of moles of transition metals, and may be $Ni_{b1}Co_{c1}X_{d1}M^1_{e1}(OH)_2$ (where X is at least one selected from the group consisting of Mn and Al, $M^1$ is at least one selected from the group consisting of S, F, P, and N, 0.6≤b1≤1.0, 0≤c1≤0.2, 0≤d1≤0.2, and 0<e1≤0.1). Preferably, the transition metal hydroxide precursor may be at least one selected from the group consisting of $Ni_{0.6}Co_{0.2}Mn_{0.2}S_{0.03}(OH)_2$, $Ni_{0.8}Co_{0.1}Mn_{0.1}S_{0.03}(OH)_2$, $Ni_{0.9}Co_{0.05}Mn_{0.05}S_{0.03}(OH)_2$, $Ni_{0.6}Co_{0.2}Al_{0.2}S_{0.03}(OH)_2$, $Ni_{0.8}Co_{0.1}Al_{0.1}S_{0.03}(OH)_2$, $Ni_{0.9}Co_{0.05}Al_{0.05}S_{0.03}(OH)_2$, and $NiS_{0.03}(OH)_2$. In a case in which the amount of the nickel is 60 mol % or more based on a total number of moles of the transition metal hydroxide precursor as described above, high capacity of a battery may be achieved when the battery is prepared by using the precursor.

For the $M^1$-doped transition metal hydroxide precursor, any method may be used without particular limitation as long as it is a method of doping a transition metal hydroxide precursor with a doping element during the preparation of the transition metal hydroxide precursor. For example, doping may be performed by a co-precipitation reaction of transition metal raw materials included in the transition metal hydroxide precursor with a doping element $M^1$-containing raw material, or the $M^1$-doped transition metal hydroxide precursor may be prepared by dry mixing and heat-treating the transition metal hydroxide precursor prepared by a co-precipitation reaction and the doping element $M^1$-containing raw material.

Also, the lithium raw material is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

A metal-containing oxide or hydroxide, which includes at least one selected from the group consisting of S, F, P, and N, may be used as the doping element $M^1$-containing raw material.

A metal-containing oxide or hydroxide, which includes at least one selected from the group consisting of Zr, B, Co, W, Mg, Ce, Ta, Ti, Sr, Ba, Hf, F, P, S, La, and Y, may be used as the doping element $M^2$-containing raw material.

The doping element $M^1$-doped transition metal hydroxide precursor, the lithium raw material, and the doping element $M^2$-containing raw material may be mixed in a molar ratio of 1:1.00:0 to 1:1.30:0.1, for example, 1:1.00:0.02 to 1:1.10:0.07. In a case in which the doping element $M^1$-doped transition metal hydroxide precursor, the lithium raw material, and the doping element $M^2$-containing raw material are mixed within the above molar ratio range, since the structural stability is excellent, a lithium transition metal oxide having excellent capacity characteristics may be prepared.

Subsequently, the mixed solution after the mixing process is sintered to prepare a $M^1$ and $M^2$-doped lithium transition metal oxide. Specifically, the sintering may be performed in a temperature range of 700° C. to 900° C., for example, 750° C. to 850° C. for 10 hours to 24 hours. In a case in which the sintering temperature satisfies the above range, a positive electrode active material ensuring structural stability may be prepared.

The $M^1$ and $M^2$-doped lithium transition metal oxide prepared as described above may more preferably be represented by Formula 1 below:

$$Li_{1+a}(Ni_bCo_cX_dM^1_eM^2_f)_{1-a}O_2 \quad [\text{Formula 1}]$$

in Formula 1, X is at least one selected from the group consisting of Mn and Al, $M^1$ is at least one selected from the group consisting of S, F, P, and N, $M^2$ is at least one selected from the group consisting of Zr, B, Co, W, Mg, Ce, Ta, Ti, Sr, Ba, Hf, F, P, S, La, and Y, $0 \le a \le 0.1$, $0.6 \le b \le 0.99$, $0 \le c \le 0.2$, $0 \le d \le 0.2$, $0 < e \le 0.1$, and $0 < f \le 0.1$.

Subsequently, a mixed solution is prepared by mixing the lithium transition metal oxide with an aqueous inorganic acid solution.

The aqueous inorganic acid solution may have a pH of 2 to 10, for example, a pH of 4 to 7. Preferably, the aqueous inorganic acid solution may include at least one selected from the group consisting of boric acid ($H_3BO_3$) and phosphoric acid ($P_2O_5$, $H_3PO_4$).

Specifically, the lithium impurities present in the surface of the lithium transition metal oxide and the aqueous inorganic acid solution may undergo an acid-base reaction by mixing the lithium transition metal oxide with the aqueous inorganic acid solution, and, accordingly, a lithium-containing inorganic compound may be formed on the surface of the lithium transition metal oxide.

The lithium impurities may be at least one selected from the group consisting of LiOH and $Li_2CO_3$, and the amount of the lithium impurities present in the surface of the lithium transition metal oxide may be increased as the amount of the nickel included in the lithium transition metal oxide is increased or may be increased as the sintering temperature during the synthesis of the lithium transition metal oxide is increased.

For example, the lithium-containing inorganic compound may be formed by the following reaction.

$$3Li_2CO_3 + H_3BO_3 \rightarrow 2Li_3BO_3 + 3H_2O + 3CO_2$$

$$3LiOH + H_3BO_3 \rightarrow Li_3BO_3 + 3H_2O$$

$$3Li_2CO_3 + 2H_3PO_4 \rightarrow 2Li_3PO_4 + 3H_2O + 3CO_2$$

$$3LiOH + H_3BO_4 \rightarrow 3Li_3PO_3 + 3H_2O$$

Finally, a lithium-containing inorganic compound layer is formed on the surface of the lithium transition metal oxide by drying the mixed solution and performing a heat treatment at 200° C. to 400° C., for example, 250° C. to 350° C.

The drying of the mixed solution is not particularly limited as long as a conventional method known in the art is used, and may be performed by hot-air drying, oven drying, and vacuum drying.

After drying the mixed solution, a solution (water) contained in the mixed solution may be removed by performing a heat treatment at 200° C. to 400° C., and the lithium-containing inorganic compound formed on the surface of the lithium transition metal oxide may be cured by the heat treatment to be formed as a lithium-containing inorganic compound layer. In this case, the formed lithium-containing inorganic compound layer may have a thickness of 3 nm to 20 nm, and may be uniformly formed across the entire surface of the lithium transition metal oxide.

Also, provided is a positive electrode for a lithium secondary battery including the positive electrode active material according to the present invention. Specifically, provided is the positive electrode for a lithium secondary battery which includes a positive electrode collector and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a binder as well as a conductive agent, if necessary, in addition to the above-described positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

After mixing 300 g of $LiNi_{0.8}Co_{0.1}Mn_{0.1}Zr_{0.04}S_{0.03}O_2$ with 100 mL of $H_3BO_3$ having a pH of 6, the mixture was subjected to a reaction for 1 hour to form $Li_3BO_3$ on a surface of the $LiNi_{0.8}Co_{0.1}Mn_{0.1}Zr_{0.04}S_{0.03}O_2$. The product thus obtained was dried at 150° C. and then heat-treated at 300° C. to prepare a positive electrode active material in which a 10 nm thick Li—B—O compound layer including $Li_3BO_3$ and $LiBO_2$ was formed on a surface of the $LiNi_{0.8}Co_{0.1}Mn_{0.1}Zr_{0.04}S_{0.03}O_2$.

The above-prepared positive electrode active material, a carbon black conductive agent, and a PVdF binder were mixed in a weight ratio of 95:2.5:2.5 in an N-methylpyrrolidone solvent to prepare a composition for forming a positive electrode. A 20 μm thick Al current collector was coated with the composition for forming a positive electrode, dried, and then roll-pressed to prepare a positive electrode.

Lithium metal was used as a counter electrode.

After the above-prepared positive electrode and the lithium metal were stacked with a Celgard 2300 separator (Celgard, LLC) to prepare an electrode assembly, the electrode assembly was put in a battery case, and an electrolyte solution, in which 1 M $LiPF_6$ was dissolved in a mixed solvent in which ethylene carbonate (EC):ethyl methyl carbonate (EMC):diethyl carbonate (DEC) were mixed in a volume ratio of 40:30:30, was injected thereinto to prepare a lithium secondary battery.

Example 2

A positive electrode and a lithium secondary battery including the same were prepared in the same manner as in Example 1 except that a positive electrode active material was used in which, after mixing 300 g of $LiNi_{0.8}Co_{0.1}Mn_{0.1}Zr_{0.04}S_{0.03}O_2$ with 100 mL of $H_3PO_4$ having a pH of 3, the mixture was subjected to a reaction for 1 hour to form a $Li_3PO_4$ layer on the surface of the positive electrode active material.

Comparative Example 1

$Ni_{0.8}Co_{0.1}Mn_{0.1}S_{0.03}(OH)_2$, LiOH, and $ZrO_2$ were mixed in a weight ratio of 1:1.03:0.004 and then sintered at 800° C. to prepare $LiNi_{0.8}Co_{0.1}Mn_{0.1}Zr_{0.04}S_{0.03}O_2$. The $LiNi_{0.8}Co_{0.1}Mn_{0.1}Zr_{0.04}S_{0.03}O_2$ was washed using distilled water at 25° C. or less. The washed $LiNi_{0.8}Co_{0.1}Mn_{0.1}Zr_{0.04}S_{0.03}O_2$ and $H_3BO_3$ were dry mixed in a weight ratio of 1:0.01 using an FM mixer and then heat-treated at 300° C. to prepare a positive electrode active material in which a Li—B—O compound including $LiBO_2$ and $Li_2B_4O_7$ was non-uniformly formed on the surface of the $LiNi_{0.8}Co_{0.1}Mn_{0.1}Zr_{0.04}S_{0.03}O_2$. A positive electrode and a lithium secondary battery including the same were prepared in the same manner as in Example 1 except that the above-prepared positive electrode active material was used.

Comparative Example 2

A positive electrode and a lithium secondary battery including the same were prepared in the same manner as in Example 1 except that $LiNi_{0.8}Co_{0.1}Mn_{0.1}O_2$ without a coating layer was used as a positive electrode active material.

Comparative Example 3

A positive electrode active material, a positive electrode, and a lithium secondary battery including the same were prepared in the same manner as in Example 1 except that $LiNi_{0.8}Co_{0.1}Mn_{0.1}S_{0.03}O_2$ was used as a nickel-containing lithium transition metal oxide.

Comparative Example 4

A positive electrode active material, a positive electrode, and a lithium secondary battery including the same were prepared in the same manner as in Example 1 except that $LiNi_{0.8}Co_{0.1}Mn_{0.1}Zr_{0.04}O_2$ was used as a nickel-containing lithium transition metal oxide.

Experimental Example 1

Life Characteristics and Resistance Characteristics Evaluation

Life characteristics and resistance characteristics were measured for each of the lithium secondary batteries prepared in Example 1 and Comparative Example 1.

Specifically, each of the secondary batteries prepared in Example 1 and Comparative Example 1 was charged at a constant current of 1 C to 4.4 V at 25° C. and cut-off charged at 0.05 C. Thereafter, each secondary battery was discharged at a constant current of 1 C to a voltage of 3 V. The charging and discharging behaviors were set as one cycle, and, after this cycle was repeated 100 times, capacity and resistance increase rates of the lithium secondary batteries according to Example 1 and Comparative Example 1 were measured. The life characteristics and resistance characteristics of Example 1 and Comparative Example 1 measured in Experimental Example 1 are presented in FIG. 1 and Table 1 below.

TABLE 1

|  | Capacity in the 100$^{th}$ cycle (mAh/g) | $R_{de}$ (Ohm) |
|---|---|---|
| Example 1 | 171 | 74 |
| Example 2 | 167 | 78 |
| Comparative Example 1 | 143 | 130 |

TABLE 1-continued

| | Capacity in the 100$^{th}$ cycle (mAh/g) | $R_{de}$ (Ohm) |
|---|---|---|
| Comparative Example 2 | 132 | 147 |
| Comparative Example 3 | 165 | 85 |
| Comparative Example 4 | 168 | 80 |

As illustrated in Table 1 and FIG. 1, with respect to the lithium secondary batteries prepared in Examples 1 and 2, it may be confirmed that capacity in the 100th cycle were 171 mAh/g and 167 mAh/g, respectively. It may be confirmed that the capacity of the lithium secondary batteries prepared in Comparative Examples 1 to 4 were inferior to those of Examples 1 and 2. Particularly, with respect to the lithium secondary battery prepared in Example 1, since two types of doping elements were included, life characteristics were improved in comparison to those of the lithium secondary batteries prepared in Comparative Examples 1 to 4.

Also, it may be confirmed that resistances in the 100$^{th}$ cycle of the lithium secondary batteries prepared in Examples 1 and 2 were 74Ω and 78Ω, respectively. Referring to FIG. 1, initial resistance of the lithium secondary batteries prepared in Examples 1 and 2 was 25Ω, and it may be confirmed that resistance increase rates after 100 cycles were about 2.9% and 3.1%, respectively, when calculated from the initial resistance value. In contrast, initial resistance of the lithium secondary batteries prepared in Comparative Examples 1 to 4 was about 20Ω, and resistance increase rates after 100 cycles were in a range of about 4% to about 7.3% when calculated from the initial resistance value, wherein it may be confirmed that Comparative Examples 1 to 4 exhibited significantly higher resistance increase rates than those of the present invention. With respect to Examples 1 and 2, resistance characteristics were more improved due to the formation of the uniform coating layer on the surface of the positive electrode active material.

The invention claimed is:

1. A positive electrode active material comprising:
a lithium transition metal oxide represented by Formula 1; and
a lithium-containing inorganic compound layer formed on a surface of the lithium transition metal oxide:

$$Li_{1+a}(Ni_bCo_cX_dM^1_eM^2_f)_{1-a}O_2 \quad \text{[Formula 1]}$$

wherein, in Formula 1,
X is at least one selected from the group consisting of manganese (Mn) and aluminum (Al),
M$^1$ is sulfur (S),
M$^2$ is zirconium (Zr), and
0≤a≤0.1, 0.6≤b≤0.99, 0≤c≤0.2, 0≤d≤0.2, 0<e≤0.1, and 0<f≤0.1.

2. The positive electrode active material of claim 1, wherein the lithium-containing inorganic compound layer comprises at least one selected from the group consisting of Li$_3$BO$_3$, LiBO$_2$, Li$_3$PO$_4$, and LiPO$_3$.

3. The positive electrode active material of claim 1, wherein the lithium-containing inorganic compound layer has a thickness of 1 nm to 200 nm.

4. The positive electrode active material of claim 1, wherein an amount of lithium impurities in a surface of the positive electrode active material is in a range of 0.1 wt % to 1.0 wt % based on a total weight of the positive electrode active material.

5. A method of preparing a positive electrode active material, the method comprising:
mixing and sintering a doping element M$^1$-doped transition metal hydroxide precursor, a lithium raw material, and a doping element M$^2$-containing raw material to prepare a lithium transition metal oxide represented by Formula 1;
mixing the lithium transition metal oxide with an aqueous inorganic acid solution to prepare a mixed solution; and
drying and heat-treating the mixed solution to form a lithium-containing inorganic compound layer on a surface of the lithium transition metal oxide:

$$Li_{1+a}(Ni_bCo_cX_dM^1_eM^2_f)_{1-a}O_2 \quad \text{[Formula 1]}$$

wherein, in Formula 1,
X is at least one selected from the group consisting of manganese (Mn) and aluminum (Al),
M$^1$ is at least one selected from the group consisting of sulfur (S), fluorine (F), phosphorus (P), and nitrogen (N),
M$^2$ is at least one selected from the group consisting of zirconium (Zr), boron (B), cobalt (Co), tungsten (W), magnesium (Mg), cerium (Ce), tantalum (Ta), titanium (Ti), strontium (Sr), barium (Ba), hafnium (Hf), F, P, S, lanthanum (La), and yttrium (Y), and
0≤a≤0.1, 0.6≤b≤0.99, 0≤c≤0.2, 0≤d≤0.2, 0<e≤0.1, and 0<f≤0.1.

6. The method of claim 5, wherein the doping element M$^1$-doped transition metal hydroxide precursor, the lithium raw material, and the doping element M$^2$-containing raw material are mixed in a molar ratio of 1:1.00:0.02 to 1:1.30:0.1.

7. The method of claim 5, wherein lithium impurities present in the surface of the lithium transition metal oxide react with the inorganic acid to form a lithium-containing inorganic compound layer.

8. The method of claim 5, wherein the aqueous inorganic acid solution has a pH of 2 to 10.

9. The method of claim 5, wherein the aqueous inorganic acid solution comprises at least one selected from the group consisting of boric acid and phosphoric acid.

10. The method of claim 5, wherein the heat-treating of the mixed solution is performed at 200° C. to 400° C.

11. A positive electrode for a lithium secondary battery, the positive electrode comprising the positive electrode active material of claim 1.

12. A lithium secondary battery comprising the positive electrode of claim 11.

* * * * *